United States Patent

Gwo-Jiang

Patent Number: 5,150,522
Date of Patent: Sep. 29, 1992

[54] COAXIAL CABLE STRIPPER WITH MEANS TO REMOVE INSULATOR CHIPS

[76] Inventor: Liaw Gwo-Jiang, No. 44, Chung Cheng Rd.,, Hsin Chuang City, Taiwan

[21] Appl. No.: 801,225

[22] Filed: Dec. 3, 1991

[51] Int. Cl.⁵ .............................................. H02G 1/12
[52] U.S. Cl. ....................................... 30/91.2; 81/9.44
[58] Field of Search ............... 81/9.4, 9.44; 30/90.1, 30/91.2, 90.6

[56] References Cited

U.S. PATENT DOCUMENTS

| | | | |
|---|---|---|---|
| 3,914,864 | 10/1975 | Prince | 30/91.2 |
| 4,070,830 | 1/1978 | Oprins | 30/90.6 |
| 4,130,031 | 12/1978 | Weiner | 30/91.2 |
| 4,829,671 | 5/1989 | Cheng | 30/90.1 |

FOREIGN PATENT DOCUMENTS 9106997  5/1991  World Int. Prop. O. ........... 81/9.51

Primary Examiner—Roscoe V. Parker
Attorney, Agent, or Firm—Lowe, Price, LeBlanc & Becker

[57] ABSTRACT

A coaxial cable stripper comprising a pressure bar pivoted to a base, a torsion spring retained in between said pressure bar and said base, a cutter holder fastened in said base at one end for stripping off the insulator of a coaxial cable inserted therein, and a crank holder fastened in said pressure bar at one end for removing insulator chips out of said cutter holder. Rotating said pressure bar on said base causes a crank on said crank holder to be moved through a recessed hole on said cutter holder so as to remove insulator chips out of the stripper after each stripping process.

2 Claims, 6 Drawing Sheets

COAXIAL CABLE STRIPPER WITH MEANS TO REMOVE INSULATOR CHIPS

BACKGROUND OF THE INVENTION

The present invention relates to coaxial cable strippers and relates more particularly to a coaxial cable stripper which has means controlled to remove insulator chips out of the stripper after each stripping process.

A coaxial cable stripper is a device convenient for cutting off an insulator from a coaxial cable. After each cutting operation, insulator chips must be completely removed so as not to obstruct further operation of a coaxial cable stripper.

SUMMARY OF THE INVENTION

The present invention has been accomplished to provide a coaxial cable stripper which has means controlled to remove insulator chips out of the stripper after each stripping process. According to the present invention, a coaxial cable stripper is generally comprised of a base, a pressure base pivoted to said base, a torsion spring retained in between said pressure base and said base, a cutter holder fastened in said base at one end, and a crank holder fastened in said pressure bar at one end relative to said cutter holder. Rotating the pressure bar on the base causes a crank on the crank holder to be moved through a recessed hole on the cutter holder so as to remove insulator chips out of the stripper after each stripping process.

DETAILED DESCRIPTION OF THE INVENTION

DETAILED DESCRIPTION OF THE PREFERRED EMBODIMENT

Figure 1:
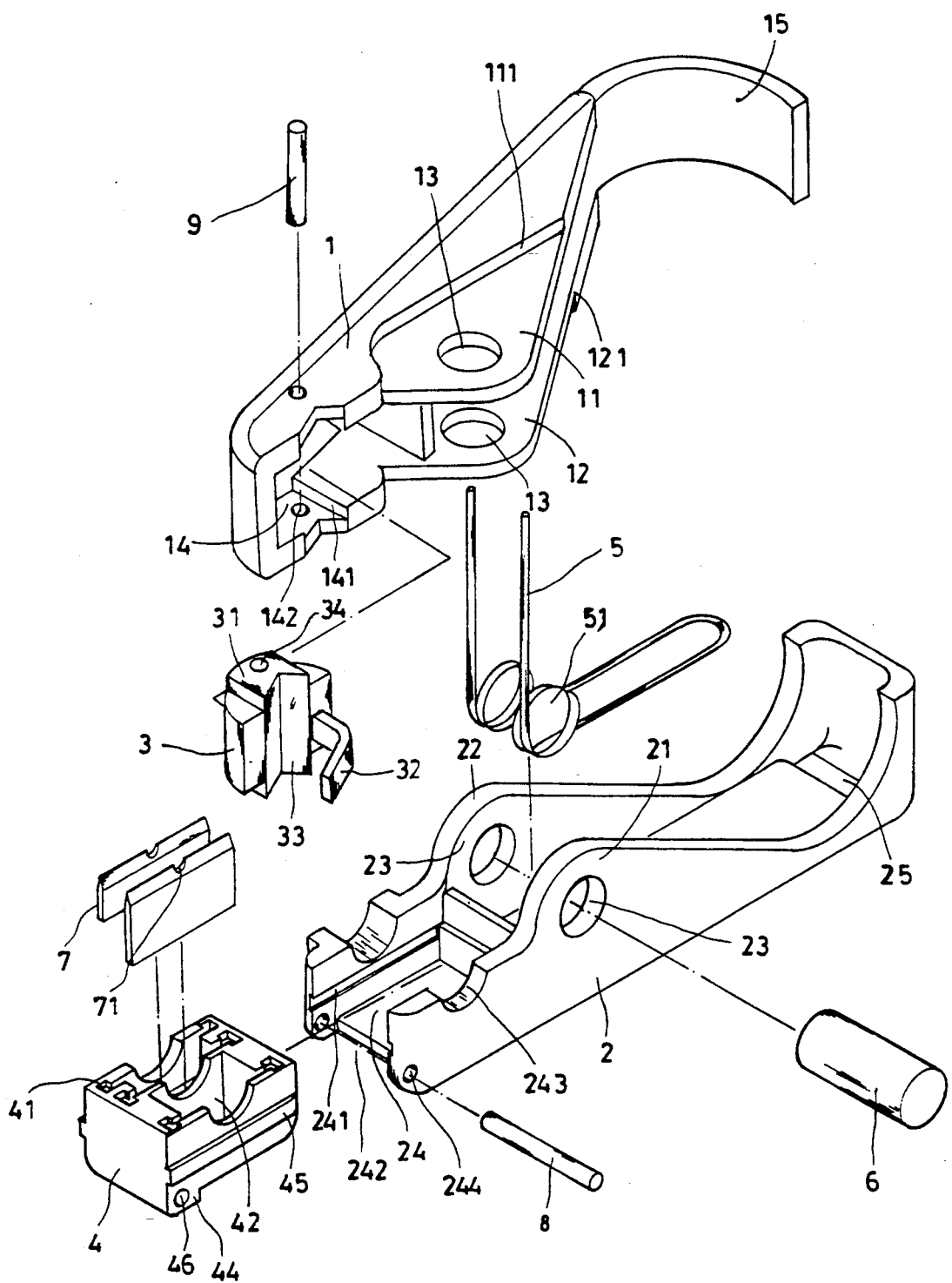
FIG. 1 is an exploded view of the device of this invention.

Turning now to the annexed drawings in detail, therein illustrated is a coaxial cable stripper embodying the present invention which is generally comprised of a pressure bar 1, a base 2, a crank holder 3, a cutter holder 4, and a spring 5.

Figure 2:
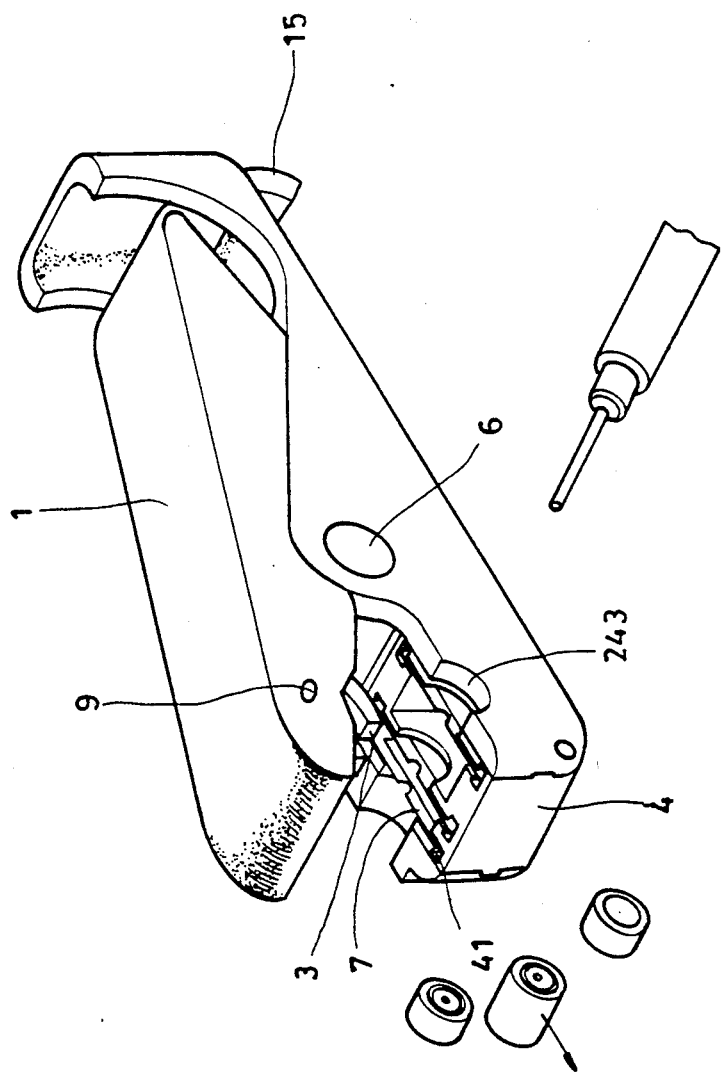
FIG. 2 is a perspective view of the device of this invention including a fragmentary view of a strip cable with the stripping parts removed also shown.
Figure 3:
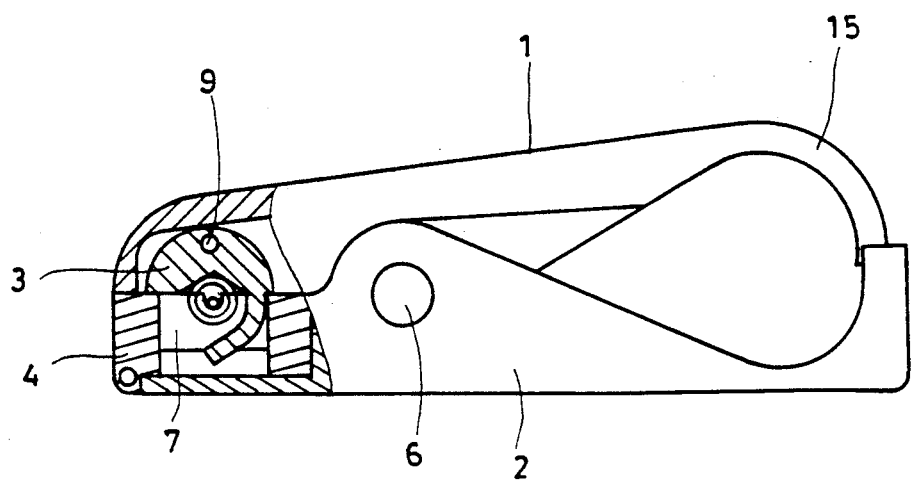
FIG. 3 is a side view of the device of this invention in partial section.
Figure 4:
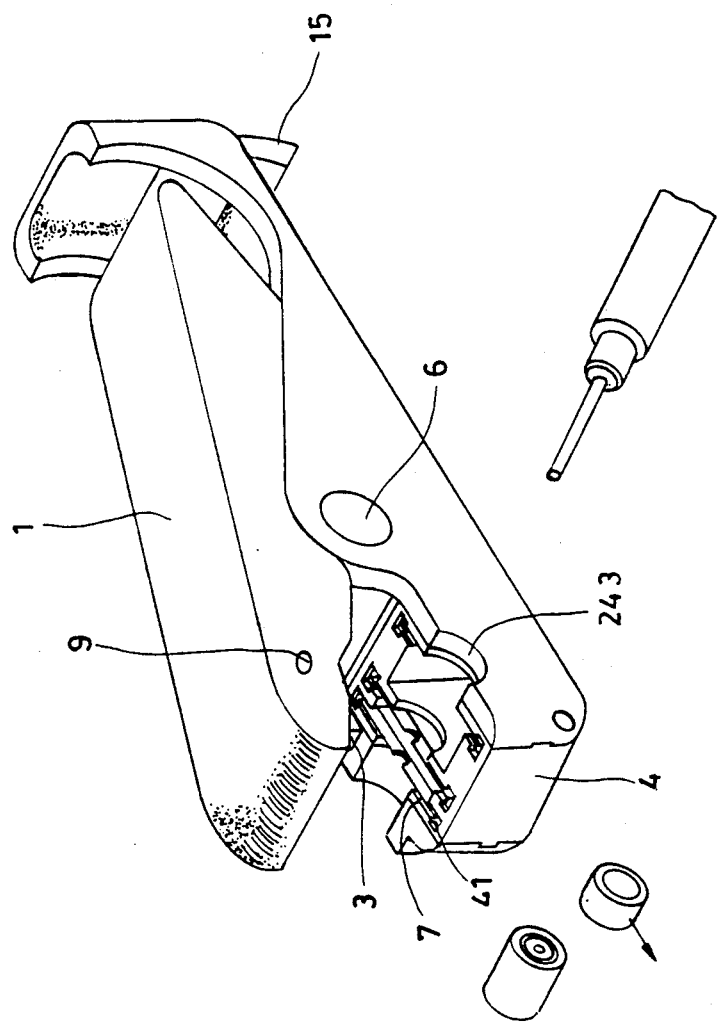
FIG. 4 is a perspective view of the device of this invention similar to FIG. 2.
Figure 5:
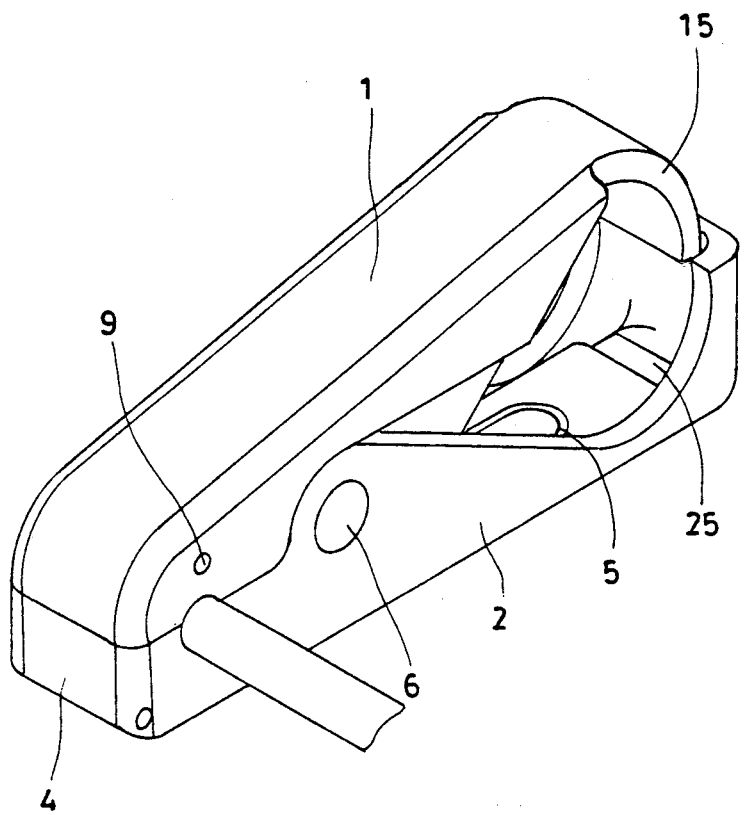
FIG. 5 is a perspective view of the device of this invention with a fragmentary portion of cable inserted therein.
Figure 6:
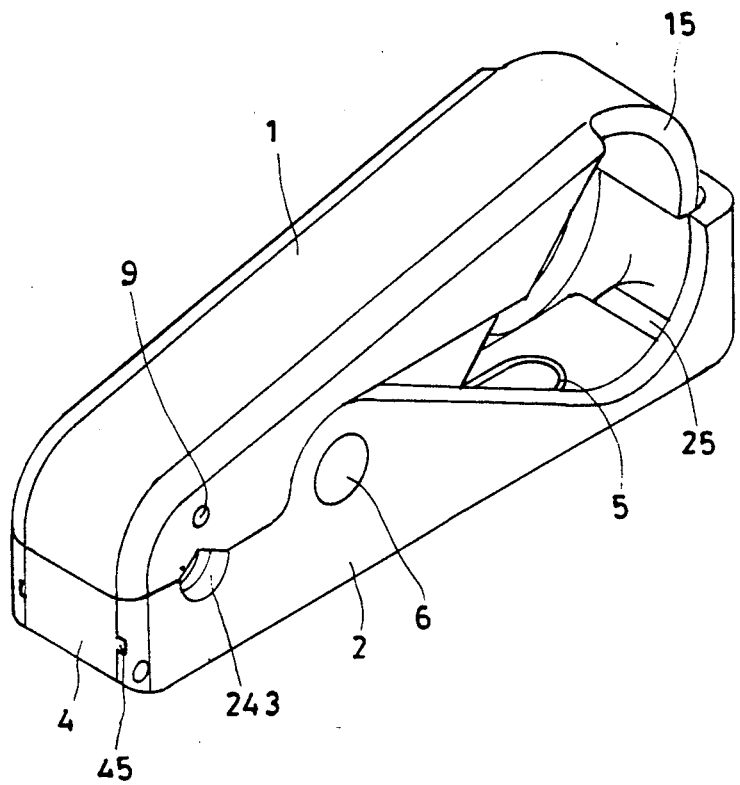
FIG. 6 is a perspective view similar to FIG. 5 showing the cable removed.

As illustrated in FIGS. 1 and 2, the pressure bar 1 comprises two vertical side walls 11, 12 at two opposite sides, a receiving chamber 14 at one end, and a curved tail 15 at an opposite end, wherein the two vertical side walls 11, 12 each has an axle hole 13 aligned with each other and a curved edge 111 or 121 at a suitable location; the receiving chamber 14 has two recessed portions 141 and two axle holes 142 respectively disposed at two opposite sides. The base 2 comprises two vertical side walls 21, 22 at two opposite sides, a receiving chamber 24 at one end, and an opening 25 at an opposite end, wherein the two vertical side walls 21, 22 each has an axle hole 23 aligned with each other; the receiving chamber 24 has two opposite grooves 241 at two opposite sides, a gap 242 at the front, two opposite axle holes 244 aligned at two opposite sides, and two opposite curved notches 243 on the two opposite top edges thereof. The crank holder 3 comprises two opposite flanges 31 at two opposite sides, a crank 32 at one end, an axle hole 34 through the two opposite flanges 31, and a curved surface 33 beneath the axle hole 34. The crank holder 3 is set inside the receiving chamber 14 in the pressure bar 1 permitting the two flanges 31 to be respectively retained in the recessed portions 141 with the axle hole 34 longitudinally aligned with the axle holes 142 and secured in place by a lock pin 9. The cutter holder 4 has a plurality of slots 41, a plurality of cutters 7 respectively inserted in the slots 41, which cutters 7 each has a notch 71 on the cutting edge thereof, a recessed hole 42 at the middle for moving the crank 32 of the crank holder 3, a bottom flange 44, an axle hole 46 through the bottom flange 44, and two side rails 45 at two opposite sides. The cutter holder 4 is inserted in the receiving chamber 24 of the base 2 by inserting the two side rails 45 into the two grooves 241, permitting the bottom flange 44 to be engaged into the gap 242 with the axle hole 46 longitudinally aligned with the two axle holes 244 for inserting a lock pin 8. By means of inserting the lock pin 8 into the axle holes 46, 244, the cutter holder 4 is firmly secured to the base 2. The spring 5 comprises two opposite loops 51 retained between the two vertical side walls 11, 12 of the pressure bar 1 and the two vertical side walls 21, 22 of the base 2 and aligned with the axle holes 13, 23 for inserting a lock pin 6. By means of inserting the lock pin 6 into the axle holes 13, 23 and the loops 51, the pressure bar 1 is pivoted to the base 2 with the spring 5 retained in therebetween.

The operation of the present invention is outlined hereinafter with reference to FIGS. 3, 4, 5 and 6. Pressing the curved tail 15 of the pressure bar 1 into the opening 25 on the base 2 causes the receiving chamber 14 of the pressure bar 1 to space from the receiving chamber 24 of the base 1, and therefore, a coaxial cable can be inserted through the curved notches 243 and supported on the crank 32 of the crank holder 3. Once pressing force is released from the curved tail 15 of the pressure bar 1, the coaxial cable is firmly retained at the cutters 7, and the crank 32 of the crank holder 3 is inserted into the recessed hole 42 of the cutter holder 4. When the coaxial cable stripper is turned through a proper angle and pulled outward relative to the coaxial cable, the insulator of the coaxial cable is partly stripped off at the desired length. After stripping, the curved tail 15 of the pressure bar 1 is pressed into the opening 25 on the base 2 again so that the crank 32 of the crank holder 3 is moved to carry stripped insulator chips out of the recessed hole 42.

Further, the size of the crank holder 3 and the cutter holder 4 and the number of the cutters 7 in the cutter holder 4 can be arranged according to requirements.

What is claimed is:

1. A coaxial cable stripper comprising:
   a pressure bar, said pressure bar comprising two vertical side walls at two opposite sides, a receiving chamber at one end, and a curved tail at an opposite end, the two vertical side walls of said pressure bar each having an axle hole aligned with each other and a curved edge at a suitable location, the receiving chamber of said pressure bar having two recessed portions and two axle holes at two opposite sides;

a base pivoted to said pressure bar, said base comprising two vertical side walls at two opposite sides, a second receiving chamber at one end, and an opening at an opposite end, the two vertical side walls of said base each having an axle hole aligned with each other, the receiving chamber of said base having two opposite grooves at two opposite sides, a gap at the front, two opposite axle holes aligned at two opposite sides, and two opposite curved notches on the two opposite top edges thereof;

a crank holder fastened in the receiving chamber of said pressure bar, said crank holder comprising two opposite flanges at two opposite sides respectively retained in said recessed portions, a crank at one end, an axle hole longitudinally aligned with the two axle holes on the receiving chamber of said pressure bar;

a cutter holder fastened in the receiving chamber of said base, said cutter holder having a plurality of slots, a plurality of cutters fastened in said slots, said cutters each having a notch on the cutting edge thereof, a recessed hole at the middle for moving said crank, a bottom flange engaged into said gap, an axle hole through said bottom flange aligned with the two opposite axle holes on the receiving chamber of said base and locked in place by a lock pin, and two side rails at two opposite sides respectively engaged in the two opposite grooves in the receiving chamber of said base; and a spring retained between said pressure bar and said base, said spring having two opposite loops at the middle secured to the axle holes on the two vertical side walls of said pressure bar and the axle holes on the two vertical side walls of said base by a lock pin.

2. The coaxial cable stripper of claim 1, wherein said crank can be moved through said recessed hole on said cutter holder to remove insulator chips out of the stripper after each stripping process by means of rotating said pressure bar on said base.

* * * * *